United States Patent [19]

Putney

[11] 4,263,996

[45] Apr. 28, 1981

[54] READILY RESETTABLE TORQUE-LIMITING COUPLING DEVICE

[75] Inventor: Gordon A. Putney, New Berlin, Wis.

[73] Assignee: Harnischfeger Corporation, W. Milwaukee, Wis.

[21] Appl. No.: 80,413

[22] Filed: Oct. 1, 1979

[51] Int. Cl.³ .......................... F16D 7/00; F16D 43/20
[52] U.S. Cl. .................................. 192/56 R; 64/29
[58] Field of Search .................. 192/56 R, 150; 64/29

[56] References Cited

U.S. PATENT DOCUMENTS

| 2,490,172 | 12/1949 | Swahnberg | 192/56 R |
|---|---|---|---|
| 2,969,132 | 1/1961 | Stewart | 192/56 R |
| 3,095,955 | 7/1963 | Orwin | 192/56 R |
| 3,185,275 | 5/1965 | Orwin | 192/56 R |
| 3,270,844 | 9/1966 | Orwin | 192/56 R |
| 3,292,754 | 12/1966 | Peterson | 192/56 R |
| 3,305,058 | 2/1967 | Orwin et al. | 64/29 X |
| 3,319,753 | 5/1967 | Orwin et al. | 64/29 X |
| 3,429,407 | 2/1969 | Orwin et al. | 64/29 X |
| 3,722,644 | 3/1973 | Steinhagen | 192/56 R |
| 3,774,738 | 11/1973 | Steinhagen | 192/56 R |

FOREIGN PATENT DOCUMENTS 979487  1/1965  United Kingdom ............... 192/56 R

*Primary Examiner*—Rodney H. Bonck
*Attorney, Agent, or Firm*—James E. Nilles

[57] ABSTRACT

The invention concerns a torque limiting coupling wherein a driven clutch member is normally constrained to rotate with a driving clutch member by balls confined in ball pockets in those two members, opening to their opposing flat faces. The clutch members are biased relatively towards one another so that the balls can roll out of the pockets when the driven member is excessively loaded. Coaxially between those members and rotatable relative to them are a disc-like synchronizing cage and a disc-like transfer cage. The synchronizing cage has a radial slot for each ball that maintains the ball in predetermined circumferentially spaced relation to the other balls. The transfer cage has a first hole for each ball that registers with ball pockets and through which the ball extends during normal drive. It also has a groove extending from each first hole in a fractional-turn spiral and terminating at a second hole. Upon overload, each ball is guided along its groove and into the second hole. While rolling along the groove the ball forces the transfer cage flatwise against the adjacent clutch member to frictionally confine the transfer cage against rotation relative to that member. When in the second hole each ball rolls on the flat clutch member faces, propelling the cages for rotation with one another but relative to both clutch members. Resetting is accomplished without tools by reverse rotation of one clutch member.

5 Claims, 5 Drawing Figures

READILY RESETTABLE TORQUE-LIMITING COUPLING DEVICE

FIELD OF THE INVENTION

This invention relates to torque limiting coupling devices of the type wherein coaxially rotatable driving and driven members, one of which is yieldingly biased axially towards the other, have axially opposing flat faces in which there are ball pockets, and wherein each of a plurality of balls is normally partly received in a ball pocket in each of said members to transmit up to a predetermined amount of torque from the driving member to the driven member, but the balls are rollingly displaceable out of those pockets, with consequent axial divergence of said members, when the torque to be transmitted is in excess of said predetermined value. The invention is more particularly concerned with a readily resettable torque limiting device of that character.

BACKGROUND OF THE PRIOR ART

When more than a predetermined torque is applied to a torque limiting device of the type to which this invention relates, the balls roll out of their pockets and onto the opposing flat surface portions of the driving and driven members, so that the driving member can then turn freely relative to the driven member as the balls minimize friction between the members while holding them spaced apart against the biasing force that tends to converge them. Once out of their pockets, the balls must be guided in their rolling motions so that they will neither re-enter the pockets nor escape from between the driving and driven members.

Prior torque limiting devices of this type usually had a cam or a slotted cage or the like whereby the balls, after leaving their pockets, were guided radially away from the annular zone in which the pockets were formed. Either the ball guiding means or some other confinement means prevented the balls from rolling to positions at which they could escape radially from between the driving and driven members.

After a torque limiting device has been tripped and the cause of the tripping has been corrected, it is desirable to be able to restore the device to its operative torque-transmitting condition as quickly and easily as possible. Such resetting requires that every ball be somehow brought back to a position in which it is seated in a pocket in each of the driving and driven members.

Although most prior torque limiting couplings were satisfactory in the performance of their torque limiting functions, every one of them seems to have had some rather note-worthy disadvantage or objectionable characteristic. One of the most frequently encountered disadvantages related to resetting. The simplest and easiest resetting procedure is merely to rotate one of the coupling members relative to the other in the direction opposite to that of their tripped-condition relative rotation. Very few prior torque limiting devices could be reset in that simple manner, and those that could be were usually complicated and relatively expensive devices with numerous parts, as exemplified by U.S. Pat. No. 3,722,644 and No. 3,774,738, both to H. G. Steinhagen.

A somewhat less complicated torque limiting device that was said to be resettable without the use of tools was disclosed in FIG. 6 of U.S. Pat. No. 3,292,754, to R. H. Peterson. However, the structure there disclosed included thin discs that were flexingly contorted during uncoupling, and this feature was not practical for all applications. Another disadvantage of that structure was that the balls moved radially outwardly when they left their pockets, and they therefore moved onto a larger diameter area of the driving and driven members, where they rolled at a substantially high speed for a given speed of rotation of the driving member and were thus subject to substantial wear when the device was running in the tripped mode. Furthermore, because the balls rolled radially outwardly from the pockets, the pockets had to be spaced from the peripheries of the driving and driven members and therefore those members had to be of relatively large radius if the balls were not to be subjected to excessive forces when transmitting near-maximum torques. Such radially outward movement of the balls upon tripping was another disadvantage that was common in prior torque limiting devices.

U.S. Pat. No. 2,969,132, to H. H. Stewart, disclosed a torque limiting device wherein the balls were guided for radially inward motion upon tripping and whereby resetting was said to be accomplished by mere reverse rotation of one of the members between which the balls were confined. But the device had disadvantages in certain other respects. When the device was running in its tripped condition, each ball rotated captively in a recess in one of the clutch members while rolling on a flat surface of the opposing clutch member. The balls and clutch members were inevitably subjected to substantial wear while the balls were dragged around during such captive rotation, with a consequent loss of one of the advantages of having the balls move radially inwardly during uncoupling. Furthermore, although the structure was relatively simple, the ball guiding grooves and recesses that had to be formed in one of the clutch members were probably rather difficult and expensive to machine. The device may also have presented some resetting problems in actual practice, because there was nothing to constrain the balls to move back to their pockets in unison, so that a certain amount of trial-and-error rotating and counter-rotating may have been needed to get all of the balls back to their normal driving positions.

A structure which embodied the essentials of the Stewart arrangement was disclosed in U.S. Pat. No. 3,095,955, to Orwin. The device of this Orwin patent was perhaps easier to manufacture than that of the Stewart patent but it suffered from the other disadvantages of the Stewart device.

In many of the commonly used torque limiting devices it was necessary to use a tool which confined a cage or guide element against rotation while one of the clutch members was reversely rotated for resetting the device. Typical of these are the couplings of U.S. Pat. No. 3,305,058 and No. 3,429,407, both to Orwin et al.

What is apparent from this review of the prior art is that there is need for a torque limiting device that is simple and inexpensive in construction, highly reliable in the performance of its torque limiting function, capable of being reset without the use of tools and with the expenditure of a minimum of time and effort, and so arranged as to subject the balls to minimum wear when the driving clutch member is rotating relative to the driven clutch member in the tripped or torque-relieving condition.

SUMMARY OF THE INVENTION

In general, the object of the present invention is to provide a torque limiting device which very satisfactorily fulfills all of the requirements just mentioned.

Another and more specific object of the invention is to provide a torque limiting device of the character described that comprises driving and driven clutch members, an inexpensive and easily made disc-like transfer cage, and an inexpensive and easily made ball synchronizing cage, wherein the transfer cage and the synchronizing cage are confined between the clutch members in coaxial relation to them and normally rotate with the clutch members but are coaxially rotatable relative to the clutch members and to one another for operation of the device in its torque-releasing condition and for resetting.

It is also a specific object of the invention to provide a torque limiting device of the character described that can be reversed as to its operative direction of rotation by a simple reversal of one of its parts.

Another specific object of the invention is to provide a torque limiting coupling device of the character described that can be arranged, if desired, for radially outward movement of the balls away from their pockets upon tripping, but which can equally well be arranged for the preferable radially inward movement of the balls that minimizes wear when the device is operating in its tripped condition and allows the ball pockets to be located near the peripheries of the driving and driven clutch members so that the latter can have relatively small diameters without the need for a strong biasing force and without sacrifice of torque transmitting capability or torque relieving reliability.

In general, the torque limiting device of the present invention is of the type that comprises coaxially rotatable driving and driven members that are under yielding axial bias relatively towards one another, and a plurality of balls that are confined between said members. Said members have axially opposing flat faces in which there are ball pockets that are spaced from one another around a coaxial annular zone, and each of the balls is normally partly received in a ball pocket in each of the members to transmit torque of up to a predetermined value from the driving member to the driven member. When torque exceeds said value, the balls are rollingly displaced out of the pockets, forcing the members apart.

The device is characterized by a disc-like transfer cage that is confined between said members and is coaxially rotatable relative to them, said transfer cage having a plurality of first holes therethrough, one for each of the balls, each of said first holes being located to register with a pocket in each of said members and being of such size that a ball received in said pockets can extend through its first hole and constrain the transfer cage to rotate with said members. The transfer cage also has a plurality of second holes, one for each of said first holes, each of said second holes being radially spaced from said zone and circumferentially spaced in one direction from its first hole, and each of said second holes is of such size that a ball can extend therethrough for rolling engagement with both of said members. The transfer cage further has a groove extending from each of said first holes to its second hole to guide a ball in rolling motion between those holes, each said groove opening towards one of said members and being arranged to prevent substantial engagement between a ball rolling therealong and the other member so that such ball, while rolling along the groove, urges the transfer cage into flatwise frictional engagement with said other member whereby the transfer cage is confined against rotation relative to that other member. Adjacent to each of its first and second holes each groove has a ramp portion which tapers away from the hole and causes a ball rolling away from the hole to climb onto the transfer cage and force it into flatwise engagement with said other member. The device also comprises a disc-like synchronizing cage that is confined between said one member and said transfer cage and is coaxially rotatable relative to them, said synchronizing cage having a radially extending slot for each of said balls through which the ball extends and by which the ball is maintained in a predetermined circumferentially spaced relation to the other balls as the balls roll along said grooves in the transfer cage.

Preferably each of the second holes in the transfer cage is smaller than its first hole and is in radially inwardly spaced relation to the annular zone of the ball pockets.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Figure 1:
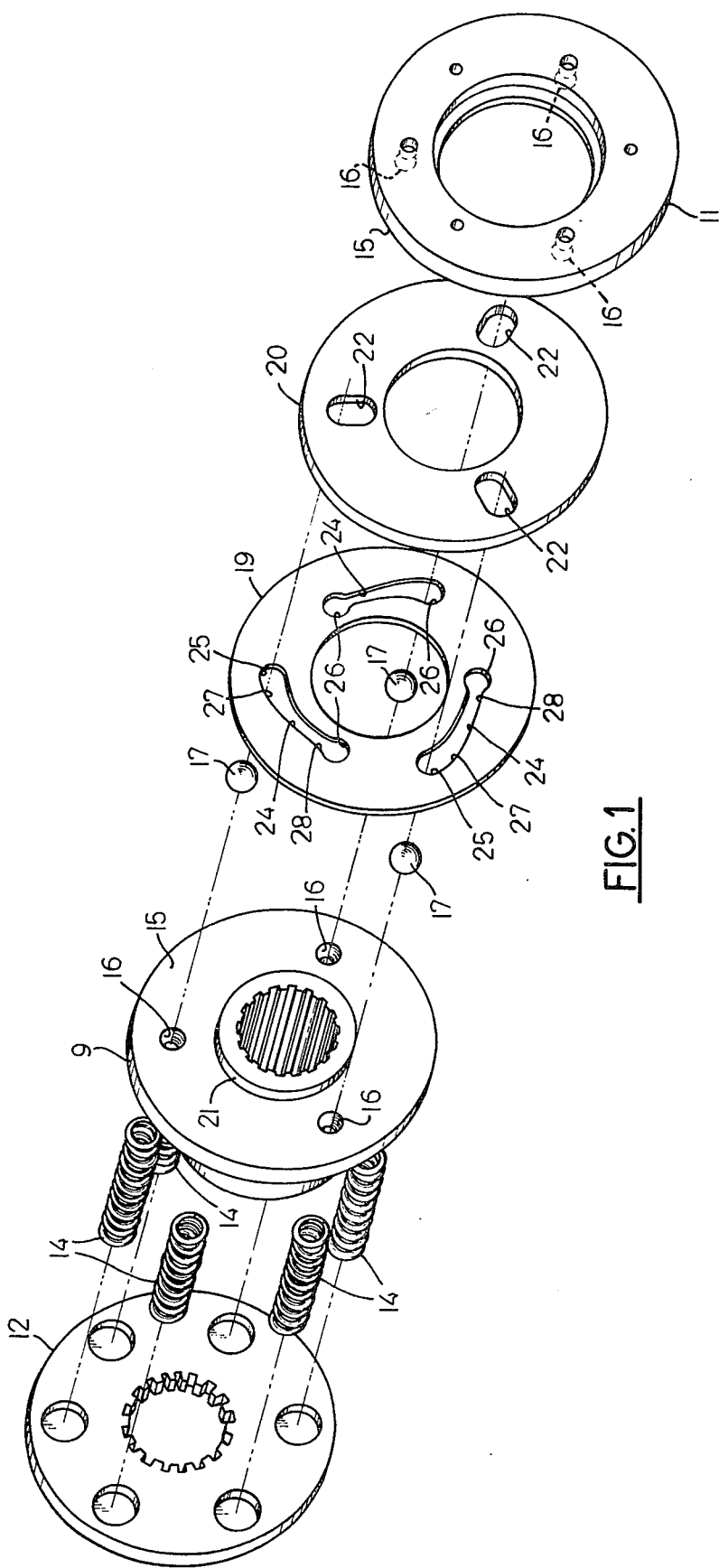
FIG. 1 is a disassembled perspective view of a torque limiting device that embodies the principles of this invention.

Referring now to the accompanying drawings, a torque limiting device 5 that embodies the principles of this invention normally provides a torque transmitting connection between a rotatable driving element 6 and a coaxially rotatable driven element 7; but when a load on the driven element 7 exceeds a predetermined value, the coupling trips, disconnecting the elements 6 and 7 from one another to permit the driving element 6 to continue to rotate while the driven element 7 stops.

The driving element 6 comprises a shaft 8 and an annular clutch member 9, while the driven element 7 comprises a driven shaft 10 and an annular driven clutch member 11. In the illustrated embodiment, the connection between the driving shaft 8 and the driving clutch member 9 comprises a sleeve A that is splined to the driving shaft 8, and there is likewise a sleeve B which is splined to the driven shaft 10 and provides a connection between it and the driven clutch member 11. A bearing M is interposed between the sleeves A and B to maintain them concentric and in predetermined axially spaced relation to one another, and a bearing N is interposed between the sleeve B and fixed structure to prevent axial displacement of the sleeves in one direction (to the right, as shown) while axial displacement of the sleeves in the opposite direction is prevented by a shoulder on the driving shaft 8 that is engaged by its sleeve A. Functionally, the sleeves A and B can be regarded as parts of the respective shafts 8 and 10, being confined against both axial and rotational motion relative to those respective shafts, but employment of the sleeves has advantages that are explained hereinafter.

The driving clutch member 9 has a splined connection with the sleeve A whereby it is constrained to rotate with that sleeve but is free for limited axial motion relative to it. The driven clutch member 11 is so fixed to the sleeve B as to be confined against all motion relative to it. As the description proceeds it will be apparent that the illustrated relationship could be reversed, with the driving clutch member fixed to the driving shaft and the driven clutch member axially slidable relative to the driven shaft but constrained to rotate with it.

In either case, the axially slidable clutch member is yieldingly biased towards the other clutch member. As shown, the biasing force is supplied by a group of coiled expansion springs 14 which have their axes parallel to the axis of the rotatable members and which react between the driving clutch member 9 and an annular spring seat 12 that is fixed to the driving shaft sleeve A. Preferably the spring seat 12 is to some extent axially adjustable along the sleeve A, for adjustment of the biasing force that the springs 14 exert upon the axially movable clutch member 9. The magnitude of that biasing force determines the magnitude of the maximum torque that will be transmitted through the coupling.

At this point it will be observed that the reaction forces of the springs 14 are taken up by the sleeve A and therefore the springs do not impose any biasing force upon the shaft 8 proper. Hence the driving shaft 8 can be a motor shaft and there is no need to make provision for accommodating end thrust loads upon it. Furthermore, the sleeves A and B, together with the clutch members 9 and 11 and the springs 14, constitute a unified subassembly, and therefore the biasing force of the springs 14 can be adjusted to a desired value on a text fixture apart from the shafts 8 and 10, the subassembly being subsequently installed on those shafts as a preadjusted unit.

Figure 2:
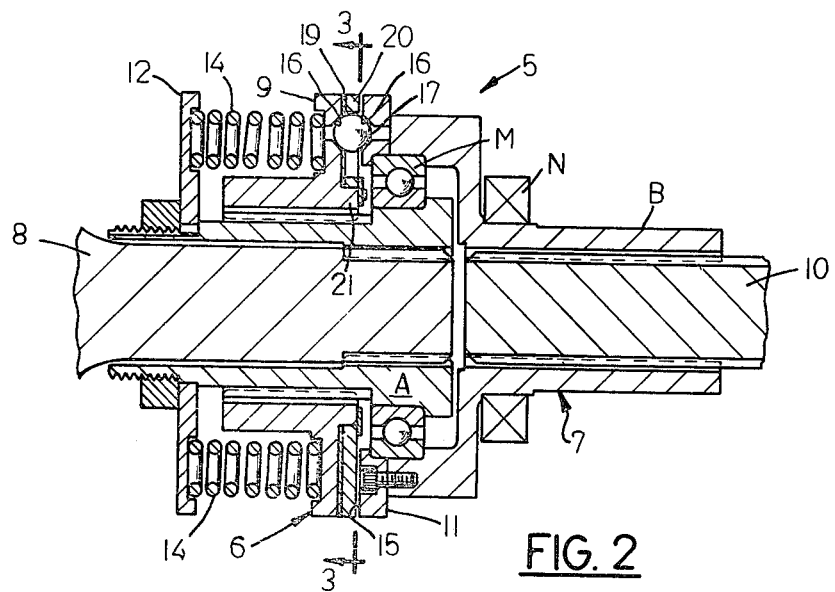
FIG. 2 is a view of the device in longitudinal section, showing it in its normal torque transmitting condition.
Figure 3:
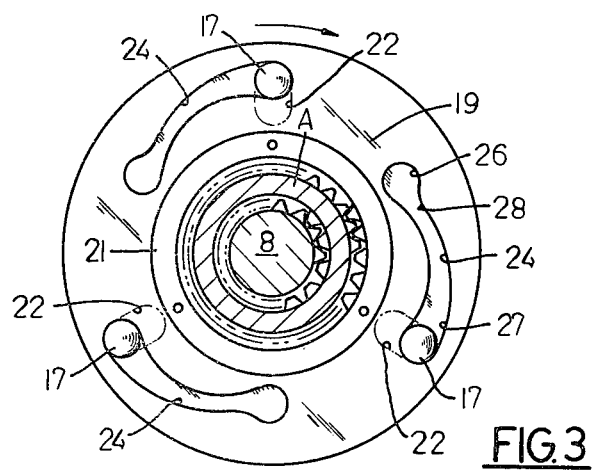
FIG. 3 is a view in cross-section, taken on the plane of the line 3—3 in FIG. 2.
Figure 4:
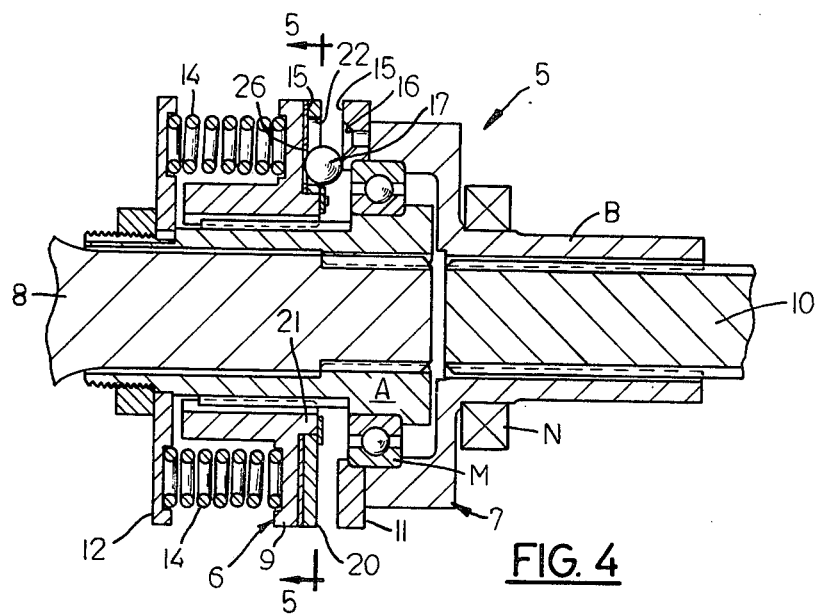
FIG. 4 is a view generally corresponding to FIG. 2 but showing the device in its tripped condition in which the driving clutch member can rotate freely without transmitting torque to the driven member.
Figure 5:
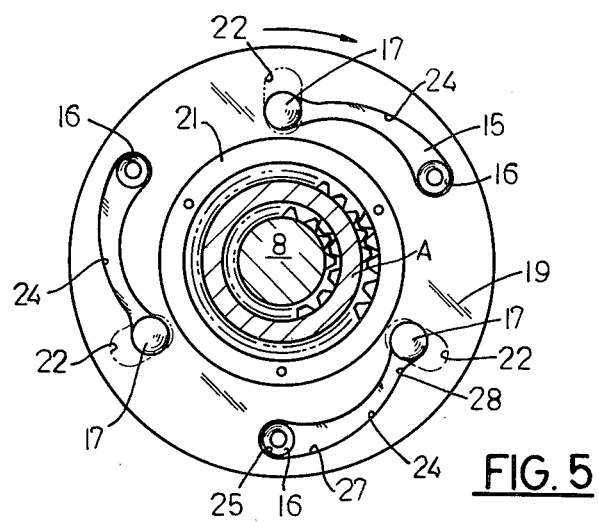
FIG. 5 is a sectional view taken on the plane of the line 5—5 in FIG. 4.

The clutch members 9 and 11 have axially opposing flat annular faces 15 to which ball pockets 16 open. All ball pockets 16 are spaced at like radial distances from the axis of the device, and the ball pockets in each clutch member are preferably spaced apart at uniform circumferential intervals. When the device 5 is in its connected condition (FIGS. 2 and 3), torque is transmitted from the driving clutch member 9 to the driven clutch member 11 through a plurality of balls 17, each of which is then partly received in a ball pocket 16 in each of the clutch members, as best seen in FIG. 2. In the present case there are three balls 17, and accordingly each of the clutch members 9 and 11 has three ball pockets 16.

As is conventional, if the load on the driven shaft 10 increases to the point where more than a predetermined torque is needed for turning it, the balls 17 are rolled out of their pockets 16, and as they emerge from the pockets they force the driving clutch member 9 away from the driven clutch member 11 against the bias of the springs 14.

The components of the coupling 5 that have been described to this point, and the arrangement and functioning of those components, are generally conventional. However, in the device of the present invention there are two ball guiding cages—namely, a transfer cage 19 and a synchronizing cage 20—that are confined between the clutch members 9 and 11. When the balls 17 roll out of their pockets 16, these cages 19 and 20 guide the balls to a zone that is radially spaced from the annular zone that contains the ball pockets 16, and there they confine the balls while the balls roll on the opposing flat faces 15 of the clutch members 9 and 11.

The balls 17 can be caused to roll in a zone that is radially outside the zone of the pockets 16, but the invention makes it equally simple and feasible to have the balls move radially inwardly from the pockets 16 when the device is tripped, and this is the preferred embodiment. When the balls 17 move radially inwardly from the pockets 16, they roll on a small diameter part of the clutch member surfaces 15 and therefore roll more slowly for a given rotational speed of the shaft 8 and are subject to less wear per shaft revolution. Furthermore, when the balls move radially inwardly from the pockets 16, the annular zone of those pockets can be near the peripheries of the clutch members 9 and 11, and therefore the balls in those pockets, in having relatively large moment arms, can transmit a relatively large torque through the coupling with the imposition of a relatively small force upon each ball. This means that the biasing force exerted by the springs 14 need not be as high as if the ball pockets 16 were close to the shaft axis, and consequently the maximum torque value can be adjusted more accurately and reliably. In prior devices wherein the balls rolled radially outwardly from the ball pockets, the clutch members had to have a larger diameter in order for the ball pockets to be located at a comparable radial distance from the axis of the device.

Both the transfer cage 19 and the synchronizing cage 20 are annular and disc-like, with opposite flat surfaces. In general, the transfer cage 19 serves to guide the balls 17 towards and from the pockets 16, while the synchronizing cage 20 serves to maintain the balls at uniform circumferential distances from one another so that the movements of each ball are synchronized with the movements of the others.

To maintain the cages 19 and 20 coaxial with the clutch members 9 and 11, one of the clutch members—in this case the driving clutch member 9—has a coaxial hub portion 21 which projects beyond its flat face 15 and towards the other clutch member, preferably projecting axially far enough to be received in the larger inside diameter of the other clutch member 11. Each of the annular cages 19, 20 has a rotatable fit on this hub portion 21. In the drawings, the transfer cage 19 is illustrated as adjacent to the driving clutch member 9 while the synchronizing cage 20 is shown next to the driven clutch member 11, but this relationship could just as well be reversed.

The synchronizing cage 20 is substantially thicker than the transfer cage 19, which is typically on the order of 0.060 in. thick for a device having clutch members of about 5½ in. diameter and having ½ in. diameter balls. The combined thicknesses of the two cages 19 and 20 is slightly less than the distance between the flat faces 15 of the clutch members 9, 11 when the balls 17 are seated in their pockets 16.

The synchronizing cage 20 has radially extending slots 22, in each of which one of the balls 17 is received. The slots 22 are of such width that the respective balls 17 can move freely along them. It will be seen that each ball 17 always remains in its particular slot 22.

The transfer cage 19 has three grooves 24, one for each ball 17. As shown, the grooves 24 are defined by slots which open through the transfer cage 19, but they function as grooves (as explained hereinafter) and they could be formed as grooves with closed bottoms that open axially towards the synchronizing cage 20.

The transfer cage 19 has three holes 25 therein which are so arranged that they can register with the ball pockets 16 in the clutch members 9 and 11. From each of the holes 25 one of the grooves 24 extends lengthwise in a radially and circumferentially oblique direction, preferably with a radially inward spiral. At its end remote from the hole 25 each groove 24 terminates at another and somewhat smaller hole 26. Although the holes 26 could be spaced radially outwardly from the annular zone in which the ball pockets 16 are located, they are preferably radially inward from that zone and are in any case so located that balls confined in them will roll on the flat faces 15 of the clutch members, clear of the ball pockets 16. If the transfer cage 19 is adjacent to the driving clutch member 9 as shown, the grooves 24 extend from their respective holes 25 in the circumferential direction opposite to that of normal driving rotation; if the transfer cage is adjacent to the driven clutch member 11, the grooves 24 extend in the opposite circumferential direction.

When the coupling device is operating for torque transmission (FIGS. 2 and 3), each ball 17 projects (in the illustrated arrangement) from its pocket 16 in the driving clutch member 9, through a hole 25 in the transfer cage and a slot 22 in the synchronizing cage 20, into a pocket 16 in the driven clutch member 11. In this condition the balls 17 constrain the cages 19 and 20 to rotate with the driving and driven clutch members 9 and 11.

When the balls 17 leave their pockets 16 in response to an overload, relative rotation between the driving and driven clutch members 9 and 11 tends to roll each ball along its groove 24 in the transfer cage, in the direction away from the hole 25 and directly into a ramp portion 27 of its groove 24 in the transfer cage. That ramp portion 27 tapers away from the hole 25. Since the hole 25 has a diameter somewhat smaller than that of the ball 17, and the ramp portion 27 of the groove 24 has edges that converge in the direction away from that hole, the ball is in effect caused to climb up onto the transfer cage and is thus carried out of contact with the adjacent clutch member (in this case the driving member 9) almost immediately upon leaving the pocket 16 therein. Meanwhile, of course, the ball remains in contact with the other clutch member (here the driven member 11), and under the biasing force of the springs 14 the ball therefore reacts between the driven member 11 and the transfer cage 19 to urge the transfer cage flatwise into frictional engagement with the driving member 9. By reason of such engagement, the transfer cage 19 is confined against rotation relative to the driving member 9, and consequently the ball continues to be rolled along its groove 24, towards the hole 26, by the continuing rotation of the driving member 9 relative to the driven member 11. The several balls are of course constrained by the synchronizing cage 20 to move along their respective grooves 24 in unison and at equal rates, and during this time the balls drive the synchronizing cage 20 for rotation relative to the clutch members 9, 11 and the transfer cage 19.

As the rolling balls near the holes 26 in the transfer cage, at the radially inner ends of the respective slots 24, the balls move along another ramp portion 28 of the groove 24. This ramp portion 28 has edges which diverge towards the hole 26. Therefore as each ball 17 approaches its hole 26 it moves axially towards the driving member 9 and then comes fully into engagement with the flat face 15 of the driving member as it enters the hole 26.

When received in the hole 26, the ball is engaged with the flat surface 15 on each of the clutch members 9, 11 under a clamping force exerted by those members in response to the biasing force of the springs 14. Now, with continuing relative rotation between the driving and driven clutch members 9, 11, the balls 17 roll on the opposing flat surfaces 15 of those members, confined by the holes 26 to roll in a zone which is radially inward of the annular zone of the ball pockets 16 and constrained by those holes 26 and by the synchronizing cage 20 to maintain their uniform circumferential spacing. Each hole 26 in the transfer cage is of such diameter that its ball 17 can rotate in it with a small clearance, and since the transfer cage 19 is no longer engaged against the driving member 9, it can be propelled by the balls for rotation relative to both of the clutch members 9 and 11. The result is that the cages 19 and 20, propelled by the rolling balls 17, rotate in unison with one another at half the speed of the driving clutch member 9. It will be apparent that in this tripped mode the balls 17 merely function as an axial thrust bearing between the clutch members 9 and 11, and the cages 19 and 20, in being able to rotate freely, impose only negligible friction upon the balls.

When the device is to be reset after being tripped, either the driving clutch member 9 can be rotated oppositely to its normal direction of rotation or the driven clutch member 11 can be rotated in its normal direction of rotation. Such relative rotation between the clutch members 9, 11 rolls the balls 17 out of the holes 26 and into the adjacent ramp portions 28 of the grooves, and the transfer cage 19 is thus again frictionally locked to the driving clutch member 9. After a fraction of a turn of the clutch member 9 or 11 that is being rotated, the balls 17 will be brought into the holes 25 and will then be back in engagement with both clutch members 9, 11. When this happens, the holes 25 in the transfer cage may not be in register with ball pockets 16 in either clutch member 9 or 11, but resetting rotation is merely continued, with the balls rolling on the flat faces 15 of the clutch members in the annular zone of the pockets 16 and driving the cages 19 and 20 for rotation relative to the clutch members. Eventually the balls 17 will be brought to pockets in one of the clutch members 9 or 11 and will enter those pockets with a perceptible snap action under the force of the springs 14. Resetting rotation is then continued. The balls remain in the pockets in which they have seated themselves and are more or less dragged across the surface 15 of the other clutch member, still drawing the cages 19 and 20 along with them. After a further fraction of a turn of resetting rotation, the balls 17 will enter the pockets 16 in the other clutch member 11 or 9, again with a perceptible snap or detent action, and the device will then be fully restored to its torque transmitting condition.

It has been found that the transfer cage 19 should be very hard, in order to prevent the edges of its grooves 24 from being compressively deformed by the balls 17 as they roll along them. The transfer cage can be made as a stamping that is case-hardened or otherwise suitably hardened after being formed.

It will be apparent that the normal direction of driving rotation can be reversed by turning the transfer cage 19 around so that it presents its axially opposite face to the driving clutch member 9, or by interchanging the positions of the transfer cage 19 and the synchronizing cage 20 so that the transfer cage 19, with its orientation unchanged, is adjacent to the driven clutch member 11.

From the foregoing description taken with the accompanying drawings it will be apparent that this invention provides a torque limiting coupling that is simple and inexpensive, operates reliably in its torque limiting function, is very long-lived because it is subjected to very little wear when operating in the tripped mode, and can be reset without the use of tools by mere rotation of one of its clutch members relative to the other.

I claim:

1. A torque limiting coupling device of the type comprising coaxially rotatable driving and driven clutch members having axially opposing flat faces in which there are ball pockets that are spaced from one another around a coaxial annular zone, and a plurality of balls, each partly receivable in a ball pocket in each of said clutch members to normally transmit torque from the driving clutch member to the driven clutch member, said clutch members being axially movable relative to one another and being yieldingly biased relatively towards one another so that when torque to be transmitted through the balls exceeds a predetermined value, the balls can roll out of said pockets while forcing the clutch members axially apart, said coupling device being characterized by:

A. a disc-like transfer cage between said clutch members, coaxially rotatable relative to them, said transfer cage having
  (1) a plurality of first holes therethrough, one for each of said balls, each of said first holes being
    (a) located to be capable of registering with a pocket in each of the clutch members and
    (b) of a size such that a ball received in said pockets can extend through said hole and constrain the transfer cage to rotate with said clutch members,
  (2) a plurality of second holes, one for each of said first holes, all of said second holes being radially spaced from said annular zone and circumferentially spaced in one direction from their respective first holes, and each of said second holes being of such size that a ball can extend therethrough for rolling engagement with both of said clutch members, and
  (3) a groove extending from each of said first holes to its second hole to guide a ball in rolling motion between those holes, every said groove opening towards one of said clutch members and having a ramp portion which tapers lengthwise along the groove from each of the holes between which the groove extends so that a ball rolling along each said groove is held out of engagement with the other of said clutch members and by its reaction against said one clutch member flatwise frictionally engages the transfer cage against said other clutch member to confine the transfer cage against rotation relative to said other clutch member; and B. a disc-like synchronizing cage between said transfer cage and said one clutch member, coaxially rotatable relative to them, said synchronizing cage having a radially extending slot for each of said balls through which the ball extends and by which it is maintained in a predetermined circumferentially spaced relation to the other balls as they roll along said grooves in the transfer cage.

2. The torque limiting coupling device of claim 1, wherein each of said second holes in the transfer cage is spaced radially inwardly from said annular zone in which said pockets are located.

3. The torque limiting device of claim 1 wherein one of said clutch members has a coaxial hub-like portion projecting axially towards the other clutch member and wherein each of said cages is annular and is mounted for coaxial rotation on said hub-like portion.

4. A torque limiting coupling device of the type comprising coaxially rotatable driving and driven clutch members having axially opposing flat faces in which there are ball pockets that are spaced from one another around a coaxial annular zone, and a plurality of balls, each partly receivable in a ball pocket in each of said clutch members to normally transmit torque from the driving clutch member to the driven clutch member, said clutch members being relatively movable axially and yieldingly biased relatively towards one another so that when torque to be transmitted through the balls exceeds a predetermined value the balls can roll out of said pockets while forcing the clutch members apart, said coupling device being characterized by ball controlling means for controlling movements of the balls relative to said clutch members when the balls are out of their pockets, said ball controlling means comprising:

a disc-like transfer cage confined between said clutch members and coaxially rotatable relative to them, said transfer cage having opposite flat faces and having
  (1) a first hole therethrough for each of said balls, each said first hole being so located and of such size that its ball can extend therethrough to be received in ball pockets in both clutch members and can constrain the transfer cage to rotate with the clutch members,
  (2) a second hole for each ball, radially spaced from said zone, all of said second holes being circumferentially spaced in one direction from their respective first holes, each second hole being of a size to confine its ball to rolling engagement with the flat faces of both clutch members while the ball constrains the transfer cage to rotation relative to the clutch members, and
  (3) a groove for each ball extending lengthwise between its first hole and its second hole, all of said grooves opening towards one of said clutch members, each groove
    (a) having a medial portion along which its ball rolls out of contact with the other of said clutch members and by reaction against said one clutch member forces the transfer cage into flatwise engagement with said other clutch member to frictionally confine the transfer cage against rotation relative to said other clutch member, and
    (b) having end portions which taper from each of said holes towards said medial portion so that the ball passes out of contact with said other clutch member immediately after rolling out of each of said first and second holes.

5. The torque limiting coupling device of claim 4 wherein said ball controlling means further comprises:
a disc-like synchronizing cage confined between said transfer cage and said one clutch member and coaxially rotatable relative to them, said synchronizing cage having a substantially radially extending slot for each of said balls whereby the ball is maintained in predetermined circumferentially spaced relationship to each of the other balls.

* * * * *